United States Patent [19]

Lang et al.

[11] 4,304,171

[45] Dec. 8, 1981

[54] POWER BOOST MECHANISM

[75] Inventors: David J. Lang; John Readman, both of Rockford, Ill.

[73] Assignee: Sundstrand Corporation, Rockford, Ill.

[21] Appl. No.: 36,133

[22] Filed: May 4, 1979

[51] Int. Cl.³ .......................... F15B 9/12; F15B 13/16
[52] U.S. Cl. .......................................... 91/3; 91/381; 91/391 R; 92/30; 92/136; 60/39.28 P
[58] Field of Search ..................... 91/381, 391 R, 390, 91/365, 367, 3; 92/29, 136, 30

[56] References Cited

U.S. PATENT DOCUMENTS

| | | |
|---|---|---|
| Re. 23,490 | 5/1952 | Alexanderson et al. |
| 1,119,324 | 12/1914 | Sprater .................................. 91/381 |
| 2,105,473 | 1/1938 | Dean ...................................... 91/381 |
| 2,613,072 | 10/1952 | Carson et al. ......................... 91/365 |
| 2,717,579 | 9/1955 | Leduc ..................................... 92/29 |
| 2,750,928 | 6/1956 | Conway et al. |
| 2,945,477 | 7/1960 | Hadekel ................................. 91/367 |
| 3,011,482 | 12/1961 | Elmer et al. |
| 3,433,133 | 3/1969 | Brewer et al. |
| 3,592,317 | 7/1971 | Chillson et al. |

Primary Examiner—Paul E. Maslousky
Attorney, Agent, or Firm—Wegner, Stellman, McCord, Wood & Dalton

[57] ABSTRACT

A power boost mechanism for converting pilot linear throttle input commands to rotary motion and providing amplification of output torque to an engine fuel control and having an output shaft adapted for connection to an engine power lever assembly. An input member is movable in response to a throttle input command and power boost structure responsive to movement of the input member causes rotation of the output shaft. The mechanism further includes feedback structure associated with the output shaft and responsive to movement thereof for returning said power boost structure to a null position independently of said input member, structure automatically enabling direct operation of the output shaft by said input member when the power boost structure is inoperative, and structure responsive to a malfunction in the engine fuel control causing limited rotation of the output shaft without movement of said input member.

6 Claims, 6 Drawing Figures

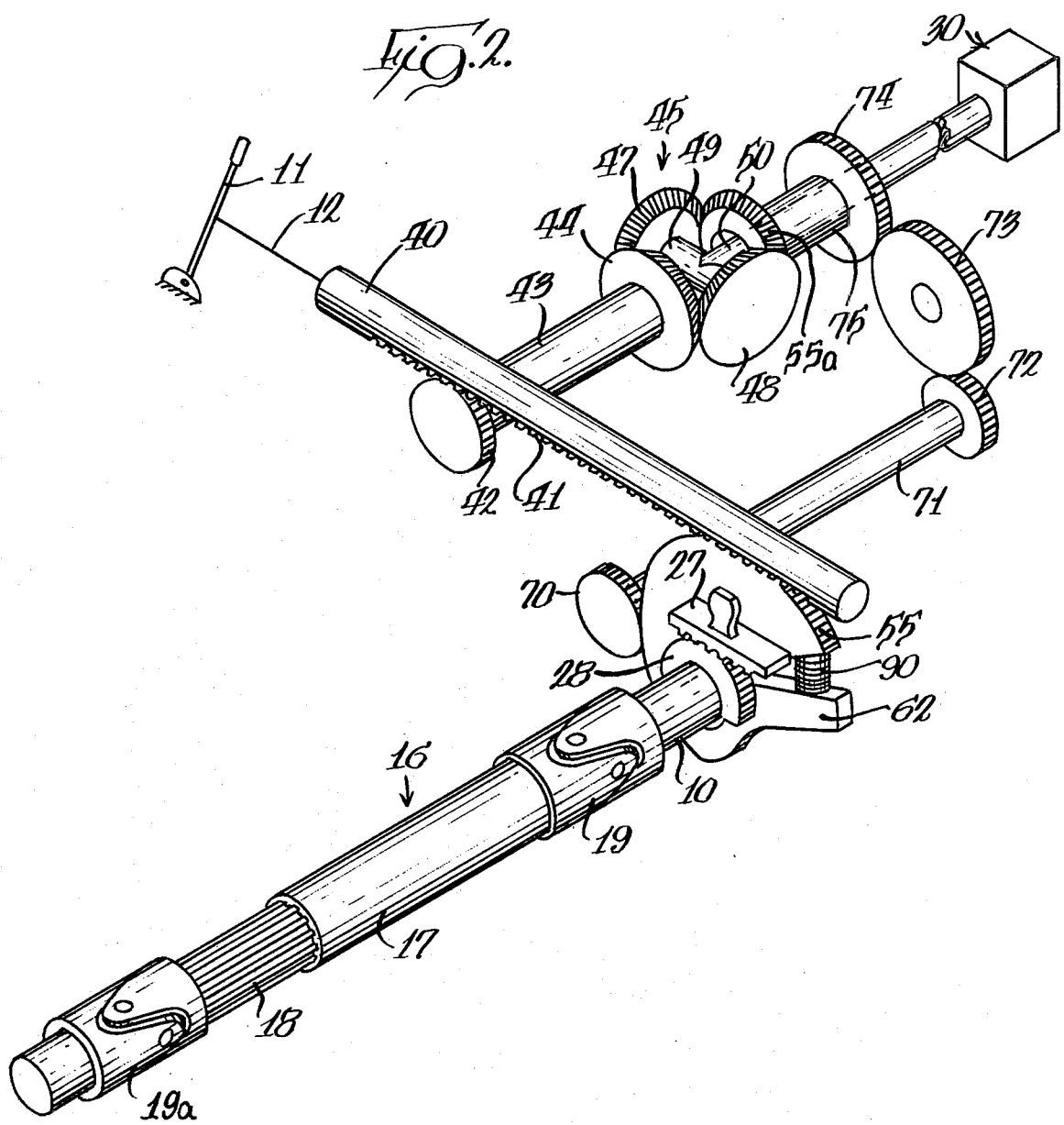

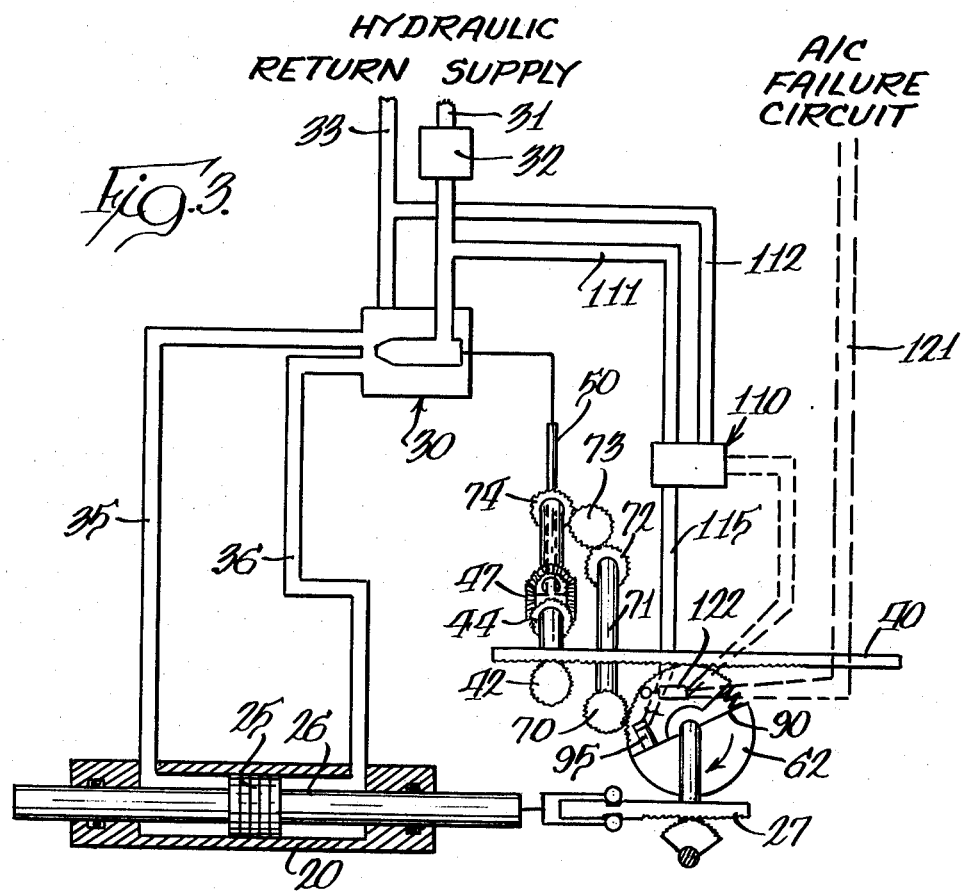
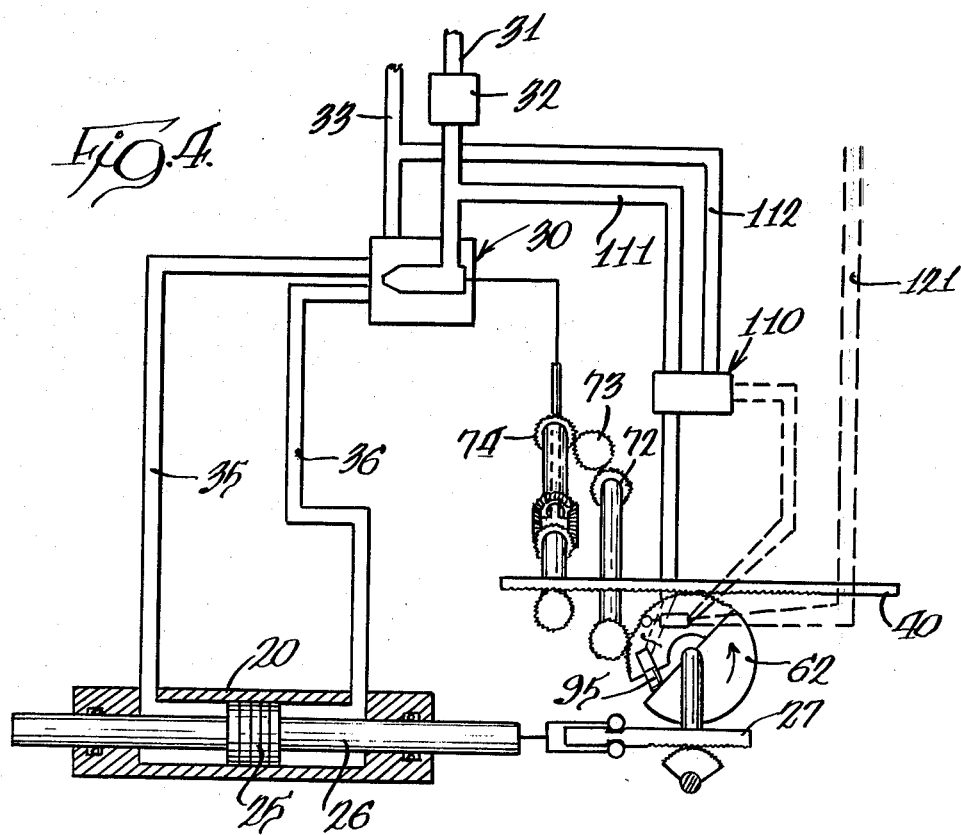

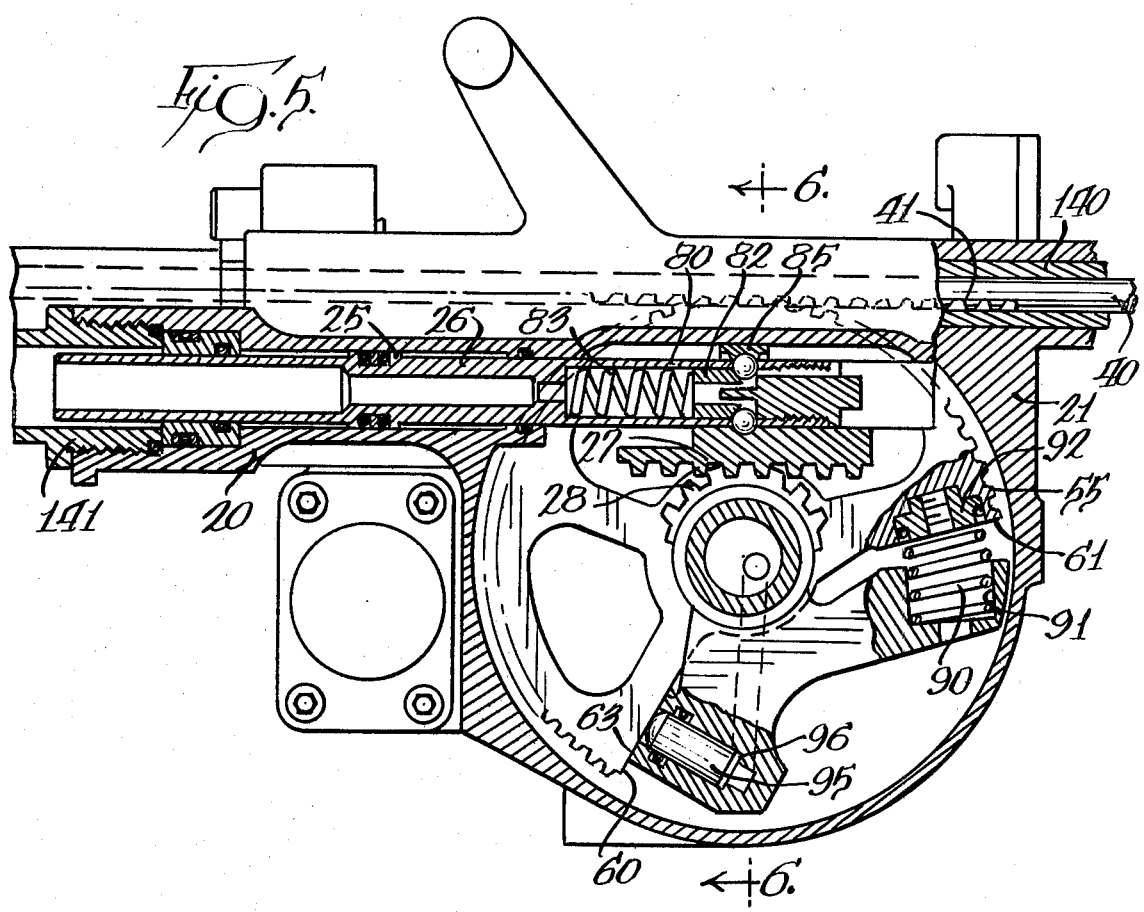
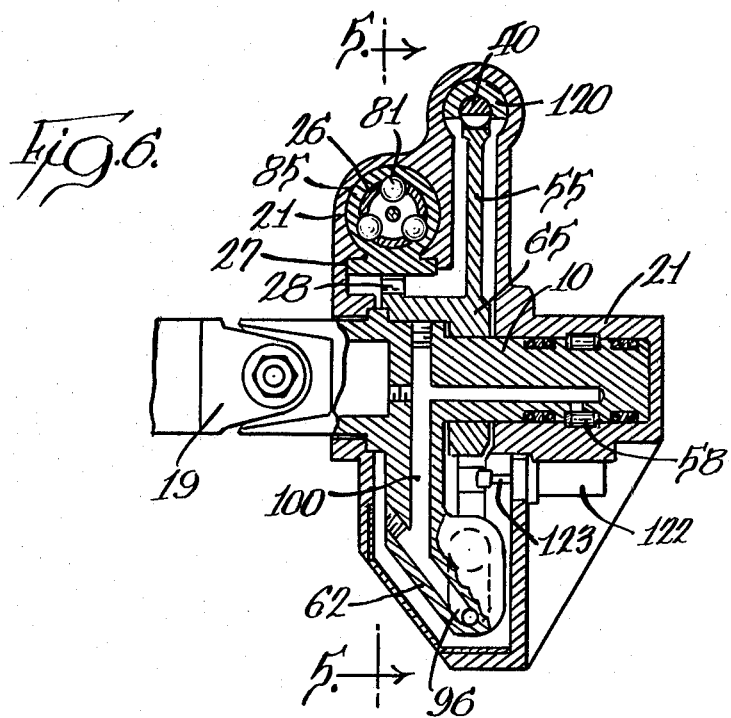

POWER BOOST MECHANISM

BACKGROUND OF THE INVENTION

This invention pertains to structure including power boost mechanism for converting linear throttle input commands from a pilot to rotary motion and amplifying output torque for control of an engine fuel control. This structure takes the form of a rack assembly having the capability for three different modes of operation. In a boost drive mode, a power boost mechanism provides boost power to the pilot's linear input command thereby lessening the work load of the pilot when operating the throttle control. In a direct drive mode, the pilot can obtain direct operation when there is a loss of boost power by a direct mechanical drive to the engine fuel control. Additionally, there is a shift mode whereby the controlling output shaft can be automatically advanced or retarded in the event there is a fuel control system failure.

Structure for providing a boost drive mode is known, with the prior art including U.S. Pat. Nos. 2,750,928 and 3,001,482. Use of a jet-pipe valve for controlling actuation of a cylinder is shown in U.S. Pat. No. 3,433,133. Also known is structure whereby there can be shift to direct manual operation on loss of fluid pressure for a power boost system, as shown in U.S. Pat. No. Re 23,490.

SUMMARY OF THE INVENTION

A primary feature of the invention disclosed herein is to provide a power boost mechanism for converting pilot linear throttle input commands to an amplified output control, with there being a boost drive mode, a direct drive mode when the power boost means is inoperative, and a shift mode for modifying the output position of the mechanism in response to a system failure in the apparatus being controlled, such as an engine fuel control.

As part of the foregoing, the power boost mechanism has a pair of linearly-movable racks, with one rack being operable by the pilot input command to control a power boost system including the second rack and with said racks being geared to pinion gear sections of a gear member operatively associated with an output shaft and with the first rack having a gap in the backlash between the teeth of the rack and associated pinion gear section whereby movement of the first rack to control the power boost mechanism does not interfere with movement of the other pinion gear section by the power boost mechanism and its rack.

As part of the foregoing, the control for the power boost mechanism includes a differential with an element driven by the input rack and another element of the differential driven in response to rotation of the output shaft to provide feedback means.

In order to provide the direct drive mode, the rack of the power boost mechanism has a releasable connection to an operating device therefor and which is releasable by manually-responsive movement of the input rack when the power boost system is incapable of movement.

A further feature of the invention is to provide a power boost mechanism and as described in the preceding paragraphs wherein there are means responsive to a malfunction in the system being controlled, such as an engine fuel control, for imparting limited rotation to an output shaft of the mechanism, without any movement of an input member which is responsive to pilot command. This structure is operable within shift range limits whereby the limited rotation only occurs within said limits and the structure acts to reverse said limited rotation and bring the output shaft back to normal operating position when the malfunction signal is cancelled, or when the output shaft has moved beyond the shift range limits.

BRIEF DESCRIPTION OF THE DRAWINGS

FIG. 2 is an isometric view of the gear train embodied in the power boost mechanism;

FIG. 3 is a schematic view of the power boost mechanism, with the parts positioned in normal operation;

FIG. 4 is a view, similar to FIG. 3, showing the parts positioned in shift mode;

FIG. 5 is a fragmentary vertical section of the power boost mechanism, taken along a longitudinal section and generally along the line 5—5 in FIG. 6; and FIG. 6 is a vertical section, taken generally along the line 6—6 in FIG. 5.

DESCRIPTION OF THE PREFERRED EMBODIMENT

Figure 1:
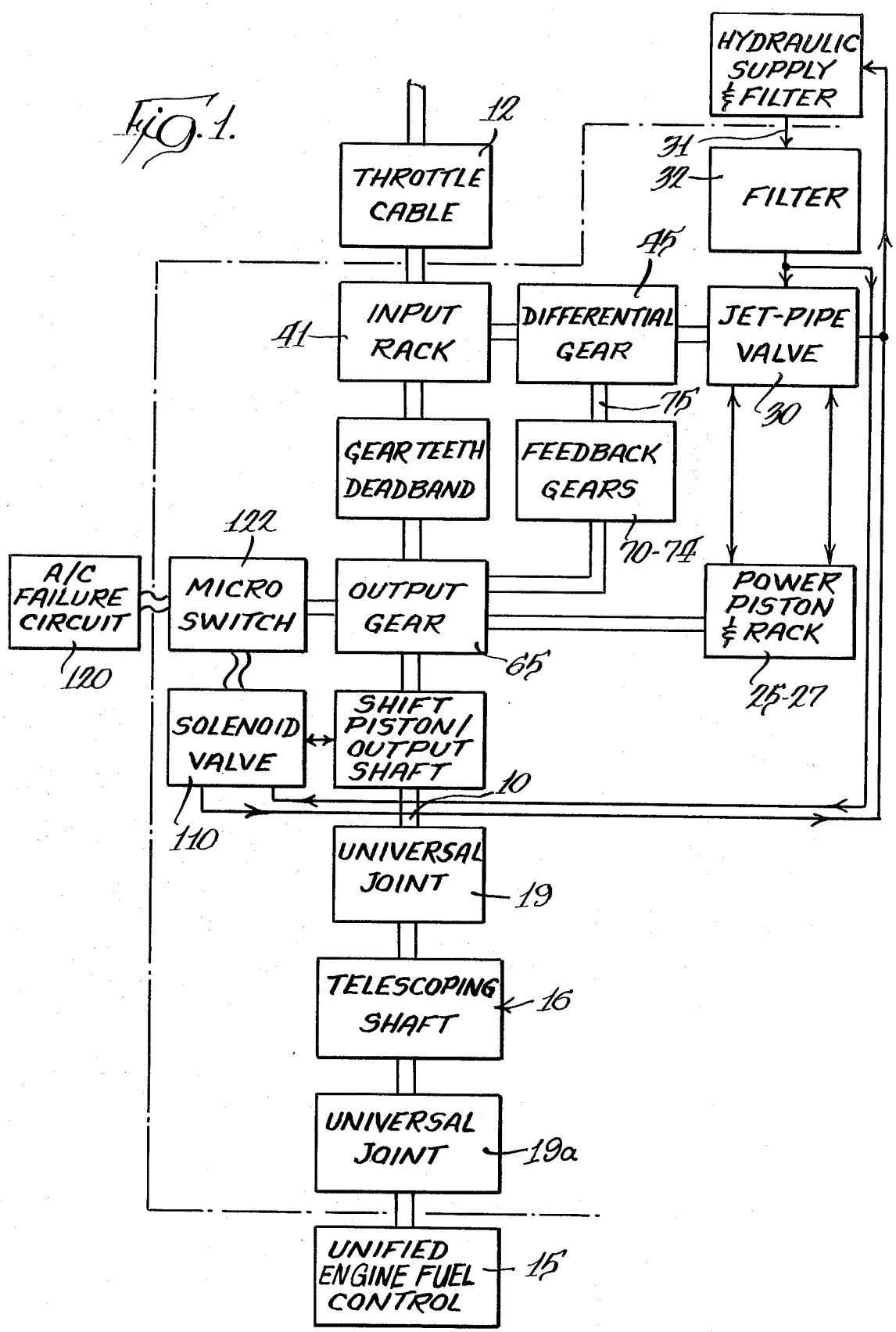
FIG. 1 is a block diagram view of the system, including the power boost mechanism for operation of a fuel control.

Referring to FIGS. 1 and 2, the power boost mechanism is provided for controlling the rotative position of an output shaft 10 in response to a linear input command, such as provided by a pilot control 11 (FIG. 2), which acts on a throttle cable, such as Bowden wire, 12 to position the output shaft 10. The position of the output shaft, as an example, is for control of a unified engine fuel control 15 for a jet engine and with the output shaft 10 being connected to an engine power lever assembly thereof by means of a telescoping shaft 16 having sections 17 and 18 and which are connected to respective universal joints 19 and 19a, as shown particularly in FIG. 2.

The power boost mechanism embodies a power boost cylinder 20 (FIGS. 3 and 4) which is formed in housing 21 (FIG. 5) which mounts the structure. A piston 25 and a piston rod 26 are movable within the cylinder and with the rod 26 being releasably connected to a rack 27 which meshes with a pinion gear section 28 which can be rotated to cause movement of the output shaft as later described.

Control of the linear position of the piston rod 26 is through operation of a jet-pipe servo valve, indicated generally at 30, which is supplied with fluid under pressure from a supply line 31 which passes through a filter 32 and which is connected to a return line 33. The jet-pipe servo valve 30 has a nozzle with a null position, as shown in FIGS. 3 and 4, and can be shifted to either side of the null position to direct fluid under pressure to one of cylinder lines 35 and 36, with the other of said cylinder lines being connected to the return line 33. Delivery of fluid under pressure to cylinder line 35 causes extension of the piston rod 26 to move the rack 27 to the right, as viewed in FIGS. 3 and 5. Delivery of fluid under pressure to line 36 causes retraction of the piston rod to move the rack 27 to the left, as viewed in FIGS. 3 and 5. With the servo valve 30 in null position, both of the cylinder lines are blocked and the piston remains in fixed position.

The jet-pipe servo valve has its position controlled in response to the pilot input command delivered through throttle cable 12 to an input member 40 having a rack 41 associated therewith. The input rack 41 engages a pinion gear 42 mounted for rotation with a member 43 which carries a bevel gear 44 of a bevel gear differential, indicated generally at 45. A pair of interconnected bevel gears 47 and 48 of the bevel gear differential have a common mounting member 49 which is connected to a shaft 50 extending to the jet-pipe servo valve 30 for positioning of the nozzle.

A fourth bevel gear 55 of the bevel gear differential forms part of feedback means. With the bevel gear 55 of the feedback means being initially held against movement, linear movement of the input member 40 causes rotation of the shaft 50 to cause movement of the jet-pipe servo valve nozzle. This causes movement of the piston rod 26 and the rack 27 for resulting rotation of the pinion gear section 28 with resulting movement of the output shaft 10 by structure to be described.

The movement of the output shaft derived from movement of the rack 27, as caused by the power cylinder 20, is independent of the direct mechanical movement of the input member 40. The input member 40, in addition to driving the pinion gear 42 for causing operation of the jet-pipe servo valve, also has the rack 41 thereof geared to an additional pinion gear section 55. The pinion gear section 55 is integral with the pinion gear section 28 on a gear member 65, as shown particularly in FIG. 6, and with the gear member being rotatably-mounted on the output shaft 10. The output shaft 10 is rotatably mounted in the housing 21 by bearing means including a bearing 58. The pinion gear section 55 is less than a complete circular gear and has a pair of faces 60 and 61 between which an output member 62 is positioned and with this output member being formed integrally with the output shaft 10. In normal operation, a face 63 of the output member is in engagement with the face 60 of the pinion gear section 55 whereby the rotative position of the pinion gear section 55 determines the rotative position of the output member 62 and the output shaft 10.

In normal operation, a pilot command causes movement of the input member 40 for direct movement of the rack 41 engaged with the pinion gear section 55 and also movement of the rack 27 through the power boost cylinder 20. Since the pinion gear sections 28 and 55 are on the common gear member 65, which is rotatable on the output shaft, it is necessary to let the power boost mechanism control in normal operation. This is accomplished by having a gap in the backlash between the teeth of the input rack 41 and the pinion gear section 55, whereby the rotation of the gear member 65 is under the control of the power boost rack 27. The input rack 41 normally is only active to control the jet-pipe servo valve 30.

Feedback mechanism for returning the nozzle of the jet-pipe servo valve to null position in response to rotative positioning of the output shaft 10 includes a gear train fromm the pinion gear section 55 back to the bevel gear 55a of the bevel gear differential 45. This gear train includes an antibacklash gear 70 in engagement with the pinion gear section 55 and which is connected by a rotatable shaft 71 to a gear 72 which meshes with an idler gear 73 and which meshes with an antibacklash gear 74 rotatably connected to the bevel gear 55a through a sleeve 75 surrounding the shaft 50 extending to the servo valve 30. The previously-mentioned gear 42 is also an antibacklash gear.

As the output shaft 10 rotates, the feedback gearing operates through the bevel gear differential 45 to cancel the initial displacement and return the nozzle of the jet-pipe valve to the null position. This eliminates any driving force from the power boost cylinder 20 and the output shaft 10 is held in position.

In the boost drive mode, the pilot's linear input command applied through member 11 to the throttle cable 12 causes movement of the input member 40 to cause operation of the servo valve in the power boost cylinder for movement of the rack 27 and rotation of the pinion gear section 28 for rotational output movement of the output shaft 10. The feedback means operating back through the bevel gear differential 45 returns the servo valve to a null position when the pilot's command has resulted in the desired rotational positioning of the output shaft 10.

With the loss of boost power with respect to the power boost cylinder 20, it is possible to go into a direct drive mode wherein a pilot may have direct mechanical linkage to the output shaft 10. An input command from the pilot causes the movement of the input member 40 whereby the input rack 41 is moved to close the gap in the backlash between the teeth of the rack and the pinion gear section 55 and resulting rotation of the pinion gear section causes rotation of the output member 62 and the output shaft. The closing of the gap is possible because the power boost cylinder 20 is not fully operative. This action can be in both directions of rotation of the output shaft resulting from bi-directional movement of the input member 40.

If there is a hard-over-failure of the jet-pipe servo valve 30, it is possible to completely release the power boost mechanism, whereby it is not necessary for the rack 27, piston 25 and piston rod 26 to follow the movement induced directly by the input member 40, as in the direct drive mode described in the preceding paragraph.

This is accomplished by the previously-mentioned releasable connection between the piston rod 26 and the rack 27. Referring particularly to FIGS. 5 and 6, the piston rod 26 has a tubular section 80, with three openings through the wall thereof and through each of which a ball 81 partially extends. The three balls 81 are urged at least partially out of the openings by means of a cylindrical plunger 82 movable within the piston rod and having a cam-shaped end engaging the balls. A spring 83 acting on the plunger urges the plunger in a direction to project the balls outwardly through the openings into engagement with coacting notches formed in a surrounding tubular section 85 of the rack 27. With quick movement of the input member 40, there is resulting rotation of the gear member 65 which effects linear movement of the rack 27 and the tubular section 85 thereof causing inward movement of the balls 81 into the tubular part 80 of the piston rod (with the piston rod being held stationary because of servo valve failure) whereby gear member 65 can rotate to cause rotation of the output shaft 10 without interference from the power boost mechanism.

The shift mode is provided in the event that the system being controlled, such as the aircraft fuel control, supplies a signal indicating a system failure. The shift mode causes automatic advance or retardation of the output shaft. Should the external system failure signal be removed, or the output shaft 10 rotate beyond shift range limits, the advance of the output shaft will be cancelled and the shaft returned to its normal operating schedule. This structure operable in shift mode is shown particularly in FIGS. 3 to 6 and embodies a shift in the relation between the output member 62 and the gear member 65. In normal operation, as previously described, the relation between these two members has the faces 60 and 63 thereof in engagement. This engagement is maintained by a spring 90 acting between these two members which, as shown in FIG. 5, is mounted in a recess 91 in the output member 62 and extends into interfitting relation with a member 92 fitted in a recess in the pinion gear section 55 of the gear member 65.

A fluid-operated piston 95 is carried within a cylinder 96 formed in the output member 62. The piston 95 is extendable by the action of fluid pressure and acts against the face 60 of the pinion gear section 55 to cause counterclockwise rotation, as viewed in FIG. 5, of the output member 62 relative to the pinion gear section 55. This movement results in rotation of the output shaft to a limited extent relative to the input member 40 whereby there is a modification in the rotational position of the output shaft without this having any effect on the linear input command to the mechanism. In one embodiment of the srtructure, this rotational shift is approximately 8°. Once pressure is released from the cylinder 96, the spring 90 is effective to cause counterclockwise rotation of the output member 62 relative to the pinion gear section 55 to return the parts to the relative positions shown in FIG. 5. In the event there is an input command to the input member 40, this will result in normal operation of the output shaft 10, in the manner previously described, even though the system is in the shift mode as caused by the piston 95 being extended by pressure in the cylinder 96.

Pressure fluid for controlling or extending the position of piston 95 is provided through passages 100 formed within the output shaft 10 which communicate with a fluid pressure source (not shown) in the housing 21 and which includes the use of suitable seals between the output shaft and the housing whereby there is no loss of fluid pressure.

The delivery of fluid to the passage 100 for extension of the piston 95 is under the control of a three-way solenoid valve, indicated generally at 110, (FIGS. 3 and 4) which is connected to the supply line 31 by means of a line 111 and connected to the return line 33 by a line 112. The valve controls a fluid line 115 in communication with the passage 100 and, when energized, causes pressure fluid to flow from line 111 to the cylinder 96 for extension of the piston 95.

The solenoid 110 is under the control of a failure circuit 120 which, through lines 121, extends to a switch 122 which determines whether the output shaft is within shift range limits.

The switch 122 has an actuator 123 (FIG. 6) positioned to coact with the gear member 65 and be contacted thereby when it is in a position representative of the output shaft being in a shift range. This switch 122 will be closed whenever the output shaft is within the shift range limits permitting electrical current to be delivered through lines 121 to energize the solenoid 110 and cause extension of the piston 95 upon occurrence of a system failure. In the event there is a signal through lines 121 and the mechanism is not in the shift range, open contacts in electrical switch 122 will prevent activation of the solenoid 110 until the mechanism is within the shift range limits. With this operation of the switch 122, it will be seen that when in a shift mode and when the mechanism moves beyond the shift range limits, the solenoid 110 will be deenergized whereby the spring 90 causes retraction of the piston 95 and the parts return to normal operating position. Also, whenever the failure signal through lines 121 is removed, the solenoid 110 would be deenergized to cause return of the parts to normal operating position.

The mechanisms can all be assembled as a single unit, as shown generally in FIG. 5, and having the housing 21 previously described. The input member 40 is movable within a tubular bore formed in the housing and with there being a tubular bearing member 140 interposed between the input member and the bore in the housing 21. This structure enables movement of the input member with little pilot effort in a direct drive mode. The power boost cylinder 20 is formed integrally in the housing 21. An open-ended bore receives the piston 25 and piston rod 26 and is closed by suitable seal members associated with the structure and an end closure member 141 threadably engaged with the housing 21. The cylinder lines 35 and 36 are formed within the housing 21 and connect one to either side of the piston rod 25, as viewed in FIG. 5.

We claim:

1. A power boost mechanism usable for converting aircraft pilot commands to motion of an output shaft comprising, an output shaft, an input member having a first rack associated therewith and movable in response to one of said pilot commands, a second rack, a gear member rotatable coaxially with the output shaft and having two pinion gear sections associated one with each rack, a power boost means including a power cylinder and piston rod associated with said second rack, means operable by said first rack for controlling said power cylinder to move said second rack and cause rotation of said gear member, said first rack and gear member having a gap in the backlash between the teeth thereof whereby movement of said first rack to control the power cylinder does not interfere with movement of the gear member by the second rack.

2. A power boost mechanism as defined in claim 1 wherein said means operable by said first rack for controlling the power cylinder includes a valve and a bevel gear differential having one element driven by the first rack and a second element connected to said valve.

3. A power boost mechanism as defined in claim 2 including feedback means for returning said valve to a null position including a third element of the bevel gear differential and a drive connection thereof to said gear member.

4. A power boost mechanism as defined in claim 1 including an automatically releasable connection between said piston rod and said second rack which is releasable by movement of said first rack and gear member when said piston rod is incapable of movement.

5. A power boost mechanism as defined in claim 4 wherein said releasable connection includes a series of balls mounted in the interior of said piston rod and spring-urged outwardly into engagement with said second rack.

6. A power boost mechanism for converting pilot linear throttle input commands to rotary motion and providing amplification of output torque comprising, an output shaft, an input member having a first rack and movable in response to one of said throttle commands, power boost means responsive to movement of the input member for causing rotation of the output shaft including a power cylinder and a rod and a second rack connected to said rod, a gear member including pinion gear means engaged by said racks, and means automatically enabling direct operation of the output shaft by said input member when said power boost means is inoperative including a releasable connection between said rod and the second rack.

* * * * *